Patented Oct. 30, 1923.

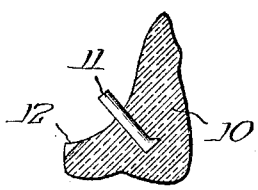
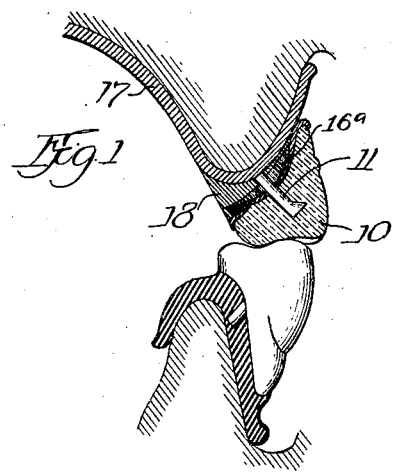
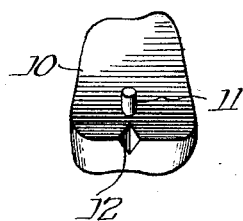
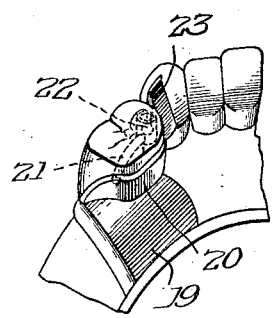
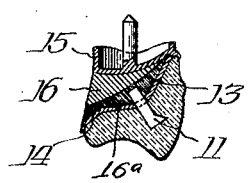
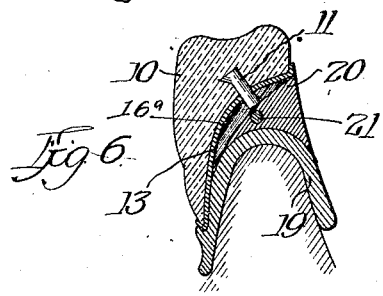

1,472,677

UNITED STATES PATENT OFFICE.

ULYSSES M. RICHARDSON, OF CHICAGO, ILLINOIS, ASSIGNOR OF ONE-HALF TO JAMES B. CROWLEY, OF CHICAGO, ILLINOIS.

TOOTH AND PROCESS OF PREPARING THE SAME.

Application filed April 17, 1922. Serial No. 554,256.

*To all whom it may concern:*

Be it known that I, ULYSSES M. RICHARDSON, a citizen of the United States, and resident of Chicago, in the county of Cook and State of Illinois, have invented certain new and useful Improvements in Teeth and Processes of Preparing the Same, of which the following is a specification.

My invention relates to an improvement in teeth adapted for use in connection with plate, continuous gum crown and bridge work.

It is customary in mounting artificial teeth on metal foundations to surface the under face of the teeth with a thin sheet of gold, the teeth being provided with two pins which project through the sheet. Thereafter solder is flowed over the surface and adheres to the pins. Thereafter the teeth may be secured by the uniting of the metals employed for the purpose in the proper position.

One of the objects of my invention is to simplify the method of making this arrangement and to lessen the chances of failure in the preparation of teeth for the described purpose. To that end I provide a tooth with a single centrally located pin instead of two pins as heretofore employed. I am thereby enabled to avoid the difficulties incident to the use of two pins, such as weakening of the tooth structure and the tendency toward the use of pins of the baser metals instead of platinum in order to reduce the cost. Furthermore, by employing one pin it may be centrally located within the teeth and the teeth thereby strengthened. However, where one pin is employed means must be provided for preventing relative turning movement of the sheet of metal employed to cover the tooth surface, and to that end I provide a cooperating groove or notch and projection on the tooth and sheet. This provision serves to obviate another objection commonly encountered in work of this character, that is, the warping or twisting of the thin sheet of gold following the flowing of solder thereon. In my construction the sheet lies perfectly flat during the described operation.

The invention will be more readily understood by reference to the accompanying drawing, wherein, Fig. 1 is a vertical sectional view through a construction in which my invention has been incorporated;

Fig. 2 is a sectional view through a tooth such as contemplated by me;

Fig. 3 is a face view of the same tooth;

Fig. 4 is a sectional view through a crown construction to which my improvement has been applied;

Fig. 5 is a perspective view of a fragment of a saddle, carrying the tooth of my invention with which is incorporated a fastening device of a well known form, and, Fig. 6 is a sectional view through the tooth shown in Fig. 5.

The tooth of my invention may be constructed as shown in Fig. 2. It consists of a body portion 10, having a single platinum pin 11, anchored and projecting perpendicularly from substantially the central point of the bottom surface of the tooth. Such surface is provided with a groove or notch 12, extending radially from the pin. This groove may be of greater or less extent as desired. It is intended for use in connection with a sheet 13 of gold adapted to cover the surface and provided with an aperture through which the pin 11 extends. The sheet is also offset as at 14, to conform to the notch or groove 12. In the crown construction shown in Fig. 4, the tooth with its surfaced lower portion is held in suitable relation to the cap 15, and thereafter gold, indicated at 16, is flowed into the space. Preliminarily the sheet is securely anchored to the tooth by causing solder to flow over the surface of the sheet and into the notch. The solder unites with the platinum pin and the gold sheet and forms a rigid structure. The solder is indicated at 16ª in Figs. 1, 4 and 6.

In Fig. 1 the construction is shown as applied to a gold plate denture. The plate is indicated at 17 and gold, shown at 18, has been flowed into the intervening space between the tooth 10 and the plate.

In the construction shown in Figs. 5 and 6 the tooth has been applied to a similar construction in which a fastening device has been utilized. A gold plate is shown at 19, and a fastening device known as the Roach attachment is incorporated in the gold 20, which has been flowed in the space between the plate and the tooth. This attachment consists of an arm 21, anchored as shown, the arm terminating in a socket 22, adapted to engage a circular projection or ball held by an inlay 23, in a live or permanent tooth. This illustration is made in order to show the adaptability of my tooth construction to different forms of dental work.

By the use of my described improvement I am able to avoid the use of two pins in the tooth and the work of preparing the tooth is simplified and made more certain. Obviously the construction is capable of modifications and I do not wish to be limited except as indicated in the appended claims.

I claim:

1. In an artificial tooth, the combination of a porcelain body having a grooved under surface, a single pin seated in the body and extending substantially perpendicularly from said surface at the center thereof, a sheet of precious metal fitted to said surface and having a portion occupying said groove whereby the sheet is prevented from rotation about the pin as a center, and solder covering said sheet of metal and filling said groove.

2. In an article of the class described, the combination of a denture element having an under surface, a single pin anchored in said denture and projecting substantially perpendicularly from said surface, a metal covering for said surface, said covering and denture having a cooperating projection and recess adapted to prevent angular movement of the covering relative to the denture, and solder overlapping said covering, filling said recess and joining said covering to said pin.

3. The process of preparing artificial teeth for continuous gum, crown and bridge work, which consists in anchoring a pin in a porcelain body with the face of the pin projecting from the lower surface thereof and providing a notch in said lower surface, then fitting a sheet of metal to said lower surface and causing a portion of the metal to occupy said notch, the pin projecting through said sheet, then flowing solder over said sheet of metal and filling said notch and firmly anchoring the solder and sheet to the pin whereby the sheet of material is prevented from rotation relative to the porcelain tooth body.

4. The process of preparing artificial teeth for continuous gum, crown and bridge work, which consists in anchoring a single pin of precious metal in a porcelain body with the face of the pin projecting from the lower surface thereof and providing a notch in said lower surface of the porcelain, then fitting a sheet of precious metal to said lower surface and causing a portion of the metal to be deflected to occupy said notch, the pin projecting through said sheet, then flowing solder over said sheet of metal to fill said notch and secure the sheet to the pin.

Signed at Chicago, Ill., this 14th day of April, 1922.

ULYSSES M. RICHARDSON.